Aug. 14, 1956      L. A. NICOLAI      2,758,959
FLUID HYDROFORMING PROCESS
Filed Dec. 26, 1951
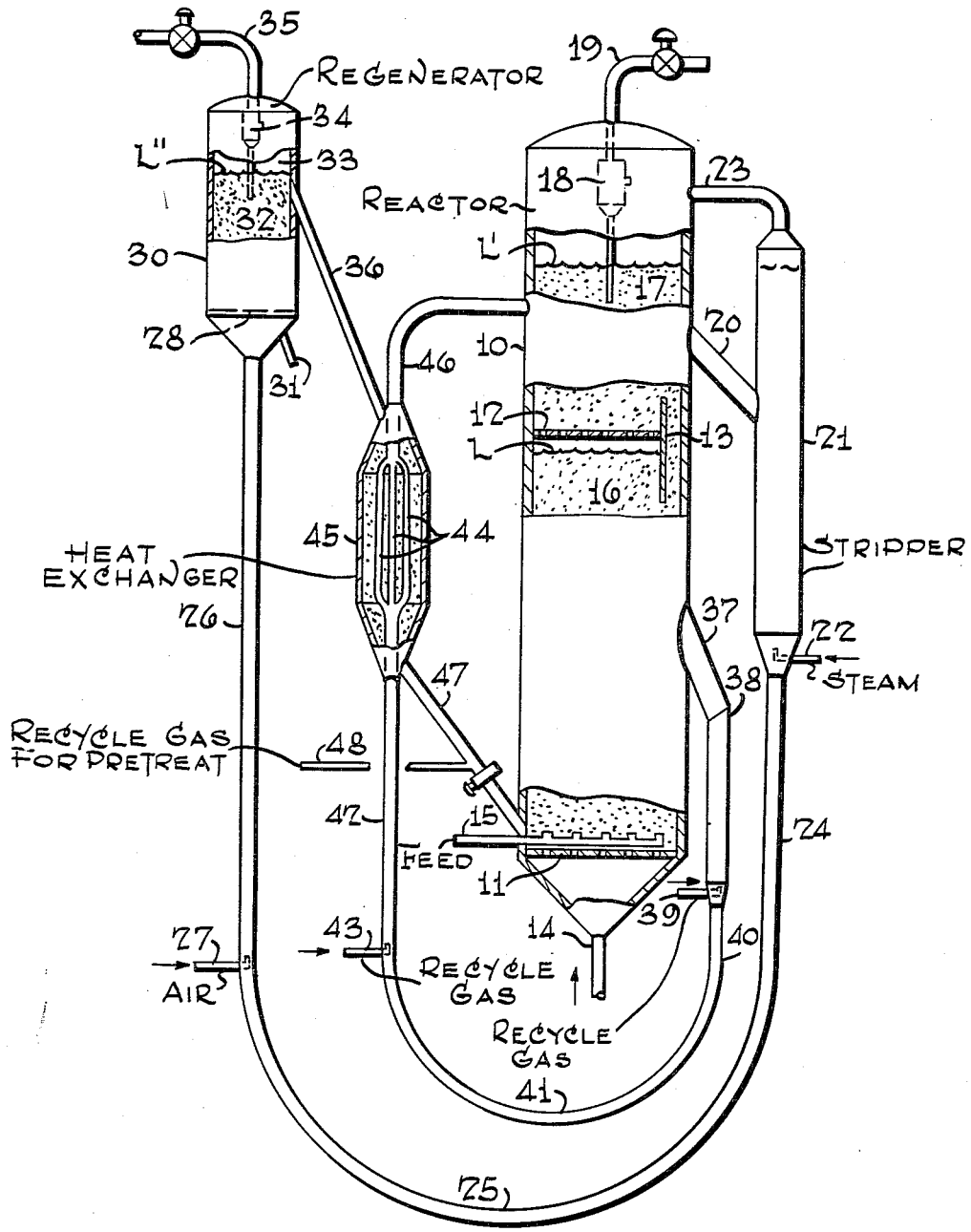
Lloyd A. Nicolai Inventor
By J. Cushman Attorney

United States Patent Office

2,758,959
Patented Aug. 14, 1956

2,758,959

FLUID HYDROFORMING PROCESS

Lloyd A. Nicolai, Baton Rouge, La., assignor to Esso Research and Engineering Company, a corporation of Delaware Application December 26, 1951, Serial No. 263,451

6 Claims. (Cl. 196—50)

This invention relates to the catalytic conversion of hydrocarbon fractions boiling within the motor fuel boiling range of low knock rating into high octane number motor fuels rich in aromatics and particularly to a process whereby such a conversion is effected by the fluidized solids technique.

Hydroforming is a well known and widely used process for treating hydrocarbon fractions boiling within the motor fuel or naphtha range to upgrade the same or increase the aromaticity and improve the anti-knock characteristics of said hydrocarbon fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are ordinarily carried out in the presence of hydrogen or a hydrogen-rich recycle gas at temperatures of 750°–1150° F. in the pressure range of about 50–1000 lbs. per sq. inch in contact with such catalysts as molybdenum oxide, chromium oxide or, in general, oxides or sulfides of metals of Groups IV, V, VI, VII and VIII of the periodic system of elements, alone, or generally supported on a base or spacing agent such as alumina gel, precipitated alumina or zinc aluminate spinel. A good hydroforming catalyst is one containing about 10 wt. per cent molybdenum oxide upon an aluminum oxide base prepared by heat treating a hydrated aluminum oxide or upon zinc aluminate spinel.

It has been proposed in Application Serial No. 188,236, filed October 3, 1951, Patent No. 2,689,823, to effect the hydroforming of naphtha fractions in a fluidized solids reactor system in which naphtha vapors are passed continuously through a dense fluidized bed of hydroforming catalyst particles in a reaction zone, spent catalyst particles are withdrawn from the dense bed in the reaction zone and passed to a separate regeneration zone where inactivating carbonaceous deposits are removed by combustion whereupon the regenerated catalyst particles are returned to the main reactor vessel or hydroforming reaction zone. Fluid hydroforming as thus conducted has several fundamental advantages over fixed bed hydroforming such as (1) the operations are continuous, (2) the vessels and equipment can be designed for single rather than dual functions, (3) the reactor temperature is substantially constant, and (4) the regeneration or reconditioning of the catalyst may be readily controlled.

A particular advantage of the foregoing fluid solids operation has been the fact that the freshly regenerated catalyst can be utilized to carry part of the heat required for the hydroforming reaction from the regeneration zone into the reaction zone. It has been proposed in this connection to discharge hot, regenerated catalyst particles from the regenerator standpipe into a stream of hot, hydrogen-rich recycle gas in a transfer line connected to the reactor whereby the catalyst particles are subjected to a reconditioning treatment involving at least a partial reduction of higher oxides of the catalytic metal formed during regeneration to a lower or a more catalytically active form of catalytic metal oxide during the passage of the catalyst particles through the transfer line into the reaction zone. In view of the higher temperature of the regenerated catalyst (1050–1200° F.) and the exothermic character of the reaction between the hot, freshly regenerated catalyst and the hydrogen it is necessary to make the ransfer line very short in order to keep the time of contact of the regenerated catalyst and hydrogen-containing gas sufficiently short to avoid overtreatment and/or thermal degradation of the catalyst.

It is the object of this invention to provide an improved method for pretreating freshly regenerated hydroforming catalyst particles preparatory to recycling the same to the reaction zone of a fluidized solids reactor system.

It is also the object of this invention to provide a method for pretreating freshly regenerated catalyst at temperatures sufficiently below regenerator temperature to avoid overtreatment and/or thermal degradation of the catalyst while still utilizing the catalyst particles for transfering heat from the regenerator side to the reactor side of the system.

It is a further object of this invention to provide a method for pretreating freshly regenerated hydroforming catalyst at temperatures sufficiently below regenerator temperature to avoid overtreatment while utilizing the catalyst particles for transferring heat from the regenerator side to the reactor side of the system in such a way as to provide an inverse temperature gradient in the reactor vessel.

These and other objects will appear more clearly from the detailed specification and claims which follow.

It has now been found that hydroforming of hydrocarbons boiling in the motor fuel or naphtha range can be effectively carried out in a fluidized solids reactor system if the reaction vessel is equipped with at least one horizontal perforated plate to provide at least two vertically spaced beds of catalyst connected by a downcomer, with circulation of reactor catalyst from the lower bed to the upper bed through a heat exhanger wherein the reactor catalyst is brought into indirect heat exchange with regenerated catalyst in order to heat up the reactor catalyst so as to maintain a higher average temperature in the upper catalyst bed and to cool off the regenerated catalyst to a temperature sufficiently low as to prevent overtreatment or thermal degradation of the regenerated catalyst when contacted with hydrogen or a hydrogen-containing gas.

Reference is made to the accompanying drawing illustrating a schematic flow plan of a fluid hydroforming reactor system embodying the present invention.

In the drawing 10 is a reactor vessel that is provided with a perforated plate or grid 11 at its lower end to insure uniform distribution of gaseous materials introduced at the bottom over the entire cross section of the reactor vessel. At least one further perforated plate 12 is provided in the upper part of the vessel. A downcomer is provided at plate 12 for conducting a stream of catalyst particles from plate 12 to the next lower plate. It will be understood that while one plate 12 and downcomer 13 is shown in the drawing more than one can be provided in order to provide a greater number of beds or contact zones. A line 14 is provided at the bottom of vessel 10 for the introduction of hydrogen-rich gas, preferably reactor recycle gas and a line 15 for the introduction of fresh feed or naphtha preferably preheated to about reaction temperature.

The reactor vessel is charged with finely divided particles of a suitable hydroforming catalyst such as molybdenum oxide upon activated alumina. The velocity of the recycle gas and feed naphtha vapors upwardly through the reactor vessel 10 is so controlled as to form a dense, fluidized, turbulent bed 16 having a definite level L above the perforated plate 11 and another dense, fluidized, turbulent bed 17 having a definite level L' above the perforated plate 12. A dilute or disperse phase comprising small amounts of catalyst entrained in reactant and reaction product vapors exists between the level L and the bottom of perforated plate 12 and a further dilute or disperse phase above the level L' in the upper part of the vessel 10. Reaction products are taken overhead from the reactor vessel preferably through a cyclone separator 18 arranged in the upper part of the vessel which serves to knock out substantially all the entrained catalyst particles which are then returned to the dense bed 17 through the dip leg attached to the bottom of separator 18. Vaporous reaction products substantially free of catalyst particles pass through product outlet line 19 to suitable fractionating, processing and/or storage equipment not shown.

A stream of catalyst particles is continuously withdrawn from the reactor vessel. In the preferred embodiment shown, this stream of catalyst particles is withdrawn from the upper dense bed 17 through spent catalyst outlet line 20 and discharged into stripper 21. A suitable stripping gas such as steam is introduced into the lower part of stripper 21 as at 22, the stripping gas passing upwardly, countercurrent to the downwardly flowing catalyst removing entrained or adsorbed hydrocarbon materials. The stripping gas and stripped vapors pass overhead from stripper 21 through outlet line 23 into the upper part of the reactor vessel where they intermingle with product vapors and pass through cyclone separator 18 in order to separate any catalyst entrained by the stripping gas. If it is desired to avoid contact of the stripping vapors with catalyst particles in the dilute phase at the top of the reactor, the outlet line 23 may be connected directly to the product outlet line 19.

The lower end of stripper 21 is necked down and connected to conduit 24 forming the downcoming leg of a U-bend transfer line. The stripper 21 and conduit 24 serve to develop a fluistatic pressure to facilitate the transfer of spent catalyst downwardly across the base 25 and into the upflowing leg 26 of the U-bend. Regeneration gas or air is introduced at 27 near the bottom of the upflowing leg 26 to reduce the density of the catalyst stream in said leg sufficiently to cause the catalyst to flow upwardly through perforated plate or distributor grid 28 into the regenerator vessel 30. In view of the rate of burning of the carbonaceous deposits upon the catalyst particles it is preferred to utilize only part of the air necessary for regeneration as a gas lift for transporting the spent catalyst through the upflow leg 26 into the regenerator and to add the remainder of the air directly to the dense bed through inlet line 31. The velocity of the regeneration gas or air through the regenerator 30 is so controlled as to form a dense, fluidized, turbulent bed 32 having a definite level L" superposed by a dilute or disperse phase 33 comprising small amounts of catalyst particles suspended in regeneration gases. Regeneration gases are taken overhead from regenerator 30 preferably through a cyclone separator 34 or the like for separating entrained catalyst particles which are returned to the dense bed 32 through the dip pipe attached to the bottom of the separator 34. Regeneration gases substantially free of catalyst are withdrawn through outlet line 35, passed through a pressure control valve to a waste gas stack or to suitable scrubbing and storage equipment if it is desired to utilize the regeneration gases for stripping purposes. A stream of regenerated catalyst particles is withdrawn from dense bed 32 through outlet line 36 preparatory to recycling the same to the reactor.

A second stream of catalyst is withdrawn from the reactor vessel 10. In the preferred embodiment, this second stream or recycle reactor catalyst stream is withdrawn from the lower dense bed 16 through outlet line 37 which discharges the recycle reactor catalyst stream into stripper 38. Stripping gas such as a small stream of recycle gas is introduced into stripper 38 through inlet line 39 in order to strip out entrained or adsorbed hydrocarbon reactants. The stripped catalyst passes into downflow leg 40 of a U-bend transfer line, across the base 41 and into the upflow leg 42. Further quantities of recycle gas are introduced into the lower part of the upflow leg 42 at 43 in order to reduce the density of the column of catalyst in the upflow leg to the point where it will flow upwardly through conduit 42 through a plurality of tubes or conduits 44 within heat exchanger 45 and thence through conduit 46 into the uppermost bed 17 in the reactor vessel 10.

Freshly regenerated catalyst withdrawn from regenerator 30 through line 36 is passed through heat exchanger 45 in the space surrounding the heat transfer tubes 44 in order to transfer heat formed in the regeneration by indirect heat exchange into the recycle reactor catalyst stream increasing its temperature to such a point that a higher average temperature is maintained in upper bed 17 than in lower bed 16. The temperature of the freshly regenerated catalyst is lowered in this heat exchange operation to a point where it may be contacted with hydrogen-rich gas in order to reduce higher oxides formed in regeneration to a lower or more catalytically active form of catalytic metal oxide without danger of overtreating or thermally degrading the catalyst by the heat generated in the reduction of the freshly regenerated catalyst. Accordingly the cooled regenerated catalyst is discharged into the heat exchanger 45 into transfer line 47. Hydrogen-rich or recycle gas is introduced into conduit or transfer line 47 as at 48 in order to effect pretreatment of the catalyst preparatory to discharging the same through slide valve 49 into the lower bed 16 in reactor vessel 10. In this way, the freshly regenerated catalyst is cooled prior to pretreatment permitting better control of the pretreatment, the sensible heat in the freshly regenerated catalyst is effectively transferred to the reaction zone and the reactor is operated with an inverse temperature gradient, i. e., the reactants are first contacted with catalyst at relatively low temperature and finally with catalyst at relatively high temperature.

The feed or charging stock to the hydroforming reactor may be a virgin naphtha, a cracked naphtha, a Fischer-Tropsch naphtha or the like. The feed stock is preheated alone or in admixture with recycle gas to reaction temperature or to the maximum temperature possible while avoiding thermal degradation of the feed stock. Ordinarily preheating of the feed stock is carried out to temperatures of about 800°–1000° F., preferably about 950° F. The naphtha preheat should be as high as possible while avoiding thermal degradation thereof as by limiting the time of residence in the preheating coils and in the transfer or feed inlet lines. The preheated feed stock may be supplied to the reaction vessel in admixture with hydrogen-rich recycle gas or it may be introduced separately as shown. The recycle gas, which contains from about 50 to 70 vol. per cent hydrogen, is preheated to temperatures of about 1100°–1300° F. preferably about 1200° F., prior to the introduction thereof into inlet line 12. The major proportion (at least 85%) of the recycle gas is introduced directly into the bottom of reactor vessel 10 while a minor proportion only (at most about 15%) is introduced into reactor catalyst recycle line or into stripper inlet line 39. The recycle gas should be circulated through the reactor at a rate of from about 1000 to 10,000 cu. ft. per bbl. of naphtha feed. In order to minimize compressor costs, the amount of recycle gas circulated should be the minimum amount which will suffice to supply the heat required and still maintain carbon formation at a low level.

The reactor system is charged with a mass of finely divided hydroforming catalyst particles. Suitable catalysts include Group VI metal oxides, such as molybdenum oxide, chromium oxide or tungsten oxide or mixtures thereof upon a carrier such as activated alumina, zinc aluminate spinel or the like. Preferred catalysts contain about 5 to 15 wt. per cent molybdenum oxide or from about 10 to 40 wt. per cent chromium oxide upon a suitable carrier. If desired minor amounts of stabilizers and promoters such as silica, calcium, ceria or potassia can be included in the catalyst. The catalyst particles are, for the most part, between 200 and 400 mesh in size or about 0–200 microns in diameter with a major proportion between 20 and 80 microns.

The hydroforming reactor vessel should be operated at temperatures between about 850° and 950° F., preferably about 875°–900° F. in the first reactor bed contacted by the fresh naphtha feed and about 900°–950° F. in the second or final reactor bed. If more than two beds are provided the temperature range in each bed will be somewhat narrower but in every case the lowest temperature will be in the first reactor bed and the highest temperature in the final reactor bed contacted by the reaction mixture. The reactor-regenerator system is operated at pressures between 50 and 500 lbs. per sq. inch. Temperatures above 900° F. result in increased carbon formation and lower selectivity to gasoline fractions while at temperatures below about 900° F. operating severity is low and would therefore require an excessively large reaction vessel. Lowering reactor pressure below 200 lbs. per sq. inch generally results in increased carbon formation which in most cases becomes excessive below about 75 lbs. per sq. inch. Above 200 lbs. per sq. inch, however, catalyst selectivity to light products ($C_4$'s) increases rapidly. The regenerator temperature is ordinarily about 1050°–1200° F. and the freshly regenerated catalyst is cooled in the heat exchanger to about 950°–1000° F. preparatory to pretreatment with hydrogen-rich or recycle gas. In view of the low temperature of the regenerated catalyst at the time that it is first contacted with hydrogen-rich or recycle gas, the pretreatment may be continued for as long as 15 minutes or more without adversely affecting the catalyst.

The weight ratio of catalyst to oil introduced into the reactor should be about 0.5 to 1.5. It is preferred to operate at catalyst to oil ratios of about 1 since ratios above about 1 to 1.5 result in excessive carbon formation. Somewhat higher weight ratios can be used at higher pressures.

Space velocity or the weight in pounds of feed charged per hour per pound of catalyst in the reactor depends upon the age of activity level of the catalyst, the character of the feed stock and the desired octane number of the product. Space velocity for a molybdenum oxide on alumina gel catalyst may vary, for example, from about 1.5 wt./hr./wt. to about 0.15 wt./hr./wt.

The foregoing description contains a limited number of embodiments of the present invention. It will be understood that numerous variations are possible without departing from the scope of the following claims.

What is claimed is:

1. In the process of hydroforming hydrocarbon fractions boiling within the motor fuel boiling range in contact with finely divided catalyst particles comprising a Group VI metal oxide upon an alumina-containing support in a fluidized solids reactor system at temperatures between about 850° F. and 950° F., at pressures of between about 50 and 500 pounds per square inch, and at catalyst to oil weight ratios of about 0.5 to 1.5, the improvement which comprises, passing hydrocarbon vapors and hydrogen-rich gas upwardly through a reactor vessel, maintaining at least two dense, fluidized, turbulent beds of catalyst in vertically spaced relation in said reactor vessel, withdrawing a stream of spent catalyst from said reactor vessel, regenerating said withdrawn spent catalyst by burning carbonaceous deposits therefrom in a separate regenerator zone, withdrawing a second stream of catalyst from the reactor vessel, passing the second stream or recycle reactor catalyst stream through a heat exchange zone, withdrawing a stream of hot, freshly regenerated catalyst from the regenerator zone, passing the stream of hot, freshly regenerated catalyst through said heat exchange zone in indirect heat exchange relation to said recycle reactor catalyst stream in order to heat the latter, returning the heated recycle reactor catalyst stream to the reactor, withdrawing cooled freshly regenerated catalyst from the heat exchange zone, contacting the cooled, freshly regenerated catalyst with a hydrogen-rich gas to effect a pretreatment of the regenerated catalyst and transferring the pretreated regenerated catalyst to the reactor.

2. In the process of hydroforming hydrocarbon fractions boiling within the motor fuel boiling range in contact with finely divided catalyst particles comprising a Group VI metal oxide upon an alumina-containing support in a fluidized solids reactor system at temperatures between about 850° F. and 950° F., at pressures of between about 50 and 500 pounds per square inch, and at catalyst to oil weight ratios of about 0.5 to 1.5, the improvement which comprises, passing hydrocarbon vapors and hydrogen-rich gas upwardly through a reactor vessel, maintaining at least two dense, fluidized, turbulent beds of catalyst in vertically spaced relation in said reactor vessel, withdrawing a stream of spent catalyst from the uppermost dense bed in said reactor vessel, regenerating said withdrawn spent catalyst by burning carbonaceous deposits therefrom in a separate regenerator zone, withdrawing a second stream of catalyst from at least one lower dense bed in the reactor vessel, passing the second stream or recycle reactor catalyst stream through a heat exchange zone, withdrawing a stream of hot, freshly regenerated catalyst from the regenerator zone, passing the stream of hot, freshly regenerated catalyst through said heat exchange zone in indirect heat exchange relation to said recycle reactor catalyst stream in order to heat the latter, returning the heated recycle reactor catalyst stream to the reactor, withdrawing cooled freshly regenerated catalyst from the heat exchange zone, contacting the cooled freshly regenerated catalyst with a hydrogen-rich gas to effect a pretreatment of the regenerated catalyst and transferring the pretreated regenerated catalyst to the reactor.

3. In the process of hydroforming hydrocarbon fractions boiling within the motor fuel boiling range in contact with finely divided catalyst particles comprising a Group VI metal oxide upon an alumina-containing support in a fluidized solids reactor system at temperatures between about 850° F. and 950° F., at pressures of between about 50 and 500 pounds per square inch, and at catalyst to oil weight ratios of about 0.5 to 1.5, the improvement which comprises, passing hydrocarbon vapors and hydrogen-rich gas upwardly through a reactor vessel, maintaining at least two dense, fluidized, turbulent beds of catalyst in vertically spaced relation in said reactor vessel, withdrawing a stream of spent catalyst from the uppermost dense bed in said reactor vessel, regenerating said withdrawn spent catalyst by burning carbonaceous deposits therefrom in a separate regenerator zone, withdrawing a second stream of catalyst from at least one lower dense bed in the reactor vessel, passing the second stream or recycle reactor catalyst stream through a heat exchange zone, withdrawing a stream of hot, freshly regenerated catalyst from the regenerator zone, passing the stream of hot, freshly regenerated catalyst through said heat exchange zone in indirect heat exchange relation to said recycle reactor catalyst stream in order to heat the latter, returning the heated recycle reactor catalyst stream to the uppermost dense bed in the reactor, withdrawing cooled freshly regenerated catalyst from the heat exchange zone contacting the cooled freshly regenerated catalyst with a hydrogen-rich gas to effect a pretreatment of the regenerated catalyst and transferring the pretreated regenerated catalyst to the lowermost dense bed in the reactor vessel.

4. In the process of hydroforming hydrocarbon fractions boiling within the motor fuel boiling range in contact with finely divided catalyst particles comprising a Group VI metal oxide upon an alumina-containing support in a fluidized solids reactor system at temperatures between about 850° F. and 950° F., at pressures of between about 50 and 500 pounds per square inch, and at catalyst to oil weight ratios of about 0.5 to 1.5, the improvement which comprises, passing hydrocarbon vapors and hydrogen-rich gas upwardly through a reactor vessel, maintaining at least two dense, fluidized, turbulent beds of catalyst in vertically spaced relation in said reactor vessel, withdrawing a stream of spent catalyst from the uppermost dense bed in said reactor vessel, regenerating said withdrawn spent catalyst by burning carbonaceous deposits therefrom in a separate regenerator zone at temperatures of 1050°–1200° F., withdrawning a second stream of catalyst from at least one lower dense bed in the reactor vessel, passing the second stream or recycle reactor catalyst stream through a heat exchange zone, withdrawing a stream of hot, freshly regenerated catalyst from the regenerator zone, passing the stream of hot, freshly regenerated catalyst through said heat exchange zone in indirect heat exchange relation to said recycle reactor catalyst stream in order to heat the latter, returning the heated recycle reactor catalyst stream to the uppermost dense bed in the reactor, withdrawing cooled freshly regenerated catalyst from the heat exchange zone at temperatures of 950°–1000° F., contacting the cooled freshly regenerated catalyst with a hydrogen-rich gas to effect a pretreatment of the regenerated catalyst and transferring the pretreated regenerated catalyst to the lowermost dense bed in the reactor vessel.

5. In the process of hydroforming hydrocarbon fractions boiling within the motor fuel boiling range in contact with finely divided catalyst particles comprising a Group VI metal oxide upon an alumina-containing support in a fluidized solids reactor system at temperatures between about 850° F. and 950° F., at pressures of between about 50 and 500 pounds per square inch, and at catalyst to oil weight ratios of about 0.5 to 1.5, the improvement which comprises passing hydrocarbon vapors and hydrogen-rich gas upwardly through a reactor vessel, maintaining an upper dense, fluidized, turbulent bed of catalyst at about 900°–950° F. and a lower dense, fluidized turbulent bed of catalyst at 875°–900° F. in vertically spaced relation in said reactor vessel, withdrawing a stream of spent catalyst from said upper dense bed, regenerating said withdrawn spent catalyst by burning carbonaceous deposits therefrom in a separate regenerator zone, withdrawing a second stream of catalyst from the lower dense bed in the reactor vessel, passing the second stream or recycle reactor catalyst stream through a heat exchange zone, withdrawing a stream of hot, freshly regenerated catalyst from the regenerator zone, passing the stream of hot, freshly regenerated catalyst through said heat exchange zone in indirect heat exchange relation to said recycle reactor catalyst stream in order to heat the latter, returning the heated recycle reactor catalyst stream to the upper dense bed in the reactor, withdrawing cooled freshly regenerated catalyst from the heat exchange zone, contacting the cooled freshly regenerated catalyst with a hydrogen-rich gas to effect a pretreatment of the regenerated catalyst and transferring the pretreated regenerated catalyst to the lower dense bed in the reactor.

6. In the process of hydroforming hydrocarbon fractions boiling within the motor fuel boiling range in contact with finely divided catalyst particles comprising a Group VI metal oxide upon an alumina-containing support in a fluidized solids reactor system at temperatures between about 850° F. and 950° F., at pressures of between about 50 and 500 pounds per square inch, and at catalyst to oil weight ratios of about 0.5 to 1.5, the improvement which comprises, passing hydrocarbon vapors and hydrogen-rich gas upwardly through a reactor vessel, maintaining an upper dense, fluidized, turbulent bed of catalyst at about 900–950° F. and a lower dense, fluidized turbulent bed of catalyst at 875°–900° F. in vertically spaced relation in said reactor vessel, withdrawing a stream of spent catalyst from said upper dense bed, regenerating said withdrawn spent catalyst by burning carbonaceous deposits therefrom in a separate regenerator zone at temperatures of 1050°–1200° F., withdrawing a second stream of catalyst from the lower dense bed in the reactor vessel, passing the second stream or recycle reactor catalyst stream through a heat exchange zone, withdrawing a stream of hot, freshly regenerated catalyst from the regenerator zone, passing the stream of hot, freshly regenerated catalyst through said heat exchange zone in indirect heat exchange relation to said recycle reactor catalyst stream in order to heat the latter, returning the heated recycle reactor catalyst stream to the upper dense bed in the reactor, withdrawing cooled freshly regenerated catalyst from the heat exchange zone at temperatures of 950°–1000° F., contacting the cooled freshly regenerated catalyst with a hydrogen-rich gas to effect a pretreatment of the regenerated catalyst and transferring the pretreated regenerated catalyst to the lower dense bed in the reactor.

References Cited in the file of this patent

UNITED STATES PATENTS

| | | |
|---|---|---|
| 2,412,025 | Zimmerman | Dec. 3, 1946 |
| 2,460,404 | Ward | Feb. 1, 1949 |
| 2,472,844 | Munday et al. | June 14, 1949 |